Jan. 28, 1969

T. T. ITAMI 3,423,914

MOBILE BEET CLEANING APPARATUS

Filed Sept. 1, 1965

Thomas T. Itami
INVENTOR.

BY Clarence A O'Brien
and Harvey B. Jackson
Attorneys

Fig. 4 ns patent office
3,423,914
Patented Jan. 28, 1969

3,423,914
MOBILE BEET CLEANING APPARATUS
Thomas T. Itami, Ontario, Oreg., assignor to Parma
Water Lifter Company, a corporation of Idaho
Filed Sept. 1, 1965, Ser. No. 484,333
U.S. Cl. 56—121.46                9 Claims
Int. Cl. A01d 23/02, 55/18

ABSTRACT OF THE DISCLOSURE

Foliage adjacent to and growing from beet tops is removed by flailing units supported by a mobile frame hitched to a towing vehicle. The mobile frame includes a wheeled frame section to which a trailing frame section is hooked on the rear side of a supporting wheel. One of the flailing units and a scalper carried by the trailing frame section held assembled cantilevered from the wheeled frame section in an adjusted position by turnbuckled links.

---

This invention generally relates to new and useful improvements in agricultural implements, and is more particularly directed towards an apparatus for use mainly in the harvesting of sugar beets.

Primarily, it is the object of the instant invention to provide a device which will in a single pass effectively defoliate the beets so as to leave them ready for removal by a digging machine.

In conjunction with the above object, it is also a significant object of the instant invention to provide defoliating apparatus which, in addition to removing the green material from the beets, will also during a single pass remove the undesirable crown of the beet.

A further object of the above invention is to provide an apparatus wherein the beet foliage will be subjected to oppositely rotating flails which effect a complete shredding of the foliage, and scalpers or knives which follow in the path of the flails and remove the beet crowns.

While the apparatus is primarily intended for use in beet harvesting, it is also a highly significant object of the instant invention that the apparatus also be adaptable for use with other crops either as a single or double flail unit.

In conjunction with the above object, it is also an object of the instant invention to provide an apparatus wherein detachably interconnected front and rear sections are provided, each section mounting a series of rotating flails and being supported, generally at the joining point therebetween, on a pair of vertically adjustable wheels.

Likewise, it is considered a significant object of the instant invention that the sections be so constructed and mounted as to enable a simultaneous adjustment of both sets of flails, as well as a simultaneous driving thereof from a common power source.

Furthermore, an important object of the instant inventon resides in the trouble free construction of the apparatus achieved by both the novel and relatively simple construction in conjunction with the provision of enlarged easily opened access panels on both sections so as to enable immediate and convenient access to all operational portions of the device for servicing.

In addition, it is an object of the instant invention to provide apparatus which can be readily adjusted or accommodated for different ground conditions, including different row spacings.

Basically, the above objects arise from the provision of a unique structure consisting broadly of transversely elongated releasably and pivotally interconnected front and rear sections supported upon a central wheel assembly located generally at the point of interconnection between the sections. Each section includes multi-blade flail units along the width thereof which are rotatably driven in a direction opposite from the flail units on the other section. The apparatus is specifically adapted to be drawn by and powered from a conventional farm tractor with the driving of the flail units being effected simultaneously through a series of endless drive belts or chains entrained over suitable pulleys and sprockets. The engagement between these sections is such so as to enable a simultaneous pivotal adjustment of both sections within a vertical plane, the rear section carrying an independently adjustable series of scalpers or beet topping knives.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Referring now more specifically to the drawings, reference numeral 20 is used to generally designate the apparatus or machine comprising the instant invention. The apparatus 20 includes front and rear sections 22 and 24 releasably and pivotally interlocked at a wheel assembly supported central point, each section 22 and 24 including a combination protective housing and mounting frame 26 and 28.

Figure 4:
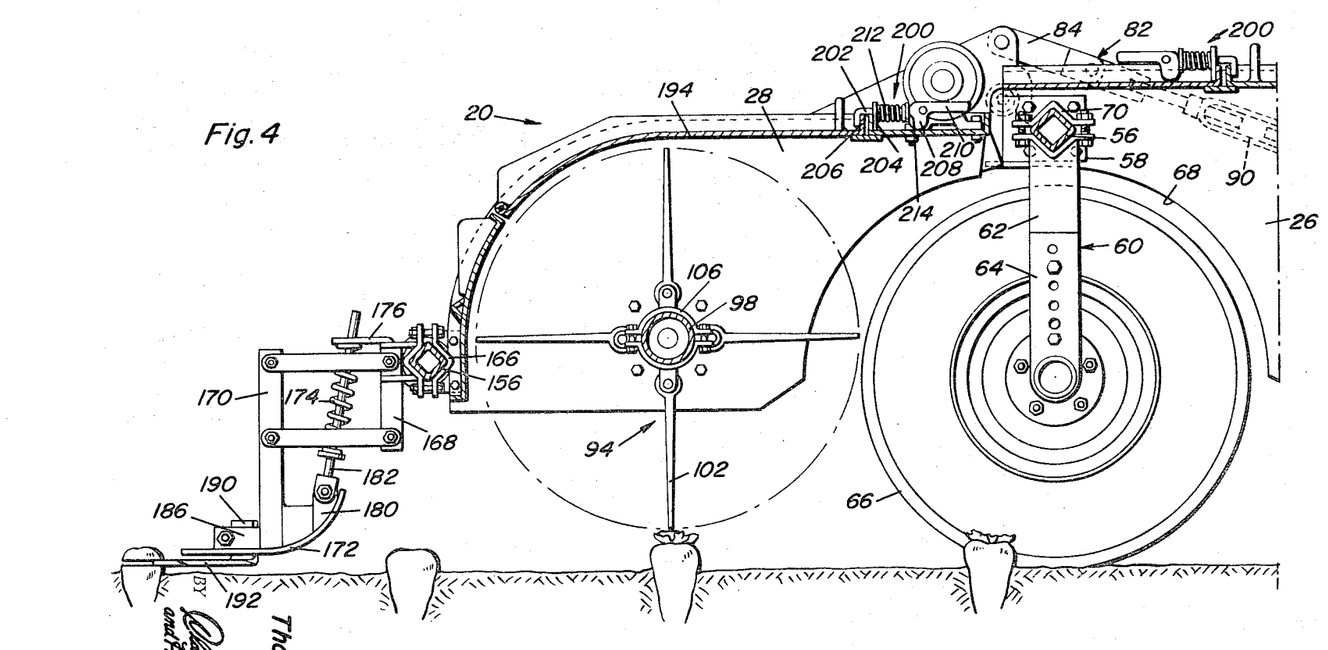
FIGURES 4 and 4a are enlarged cross-sectional views taken through the apparatus substantially on planes passing along lines 4—4 and 4a—4a in FIGURE 2.
Figure 4A:
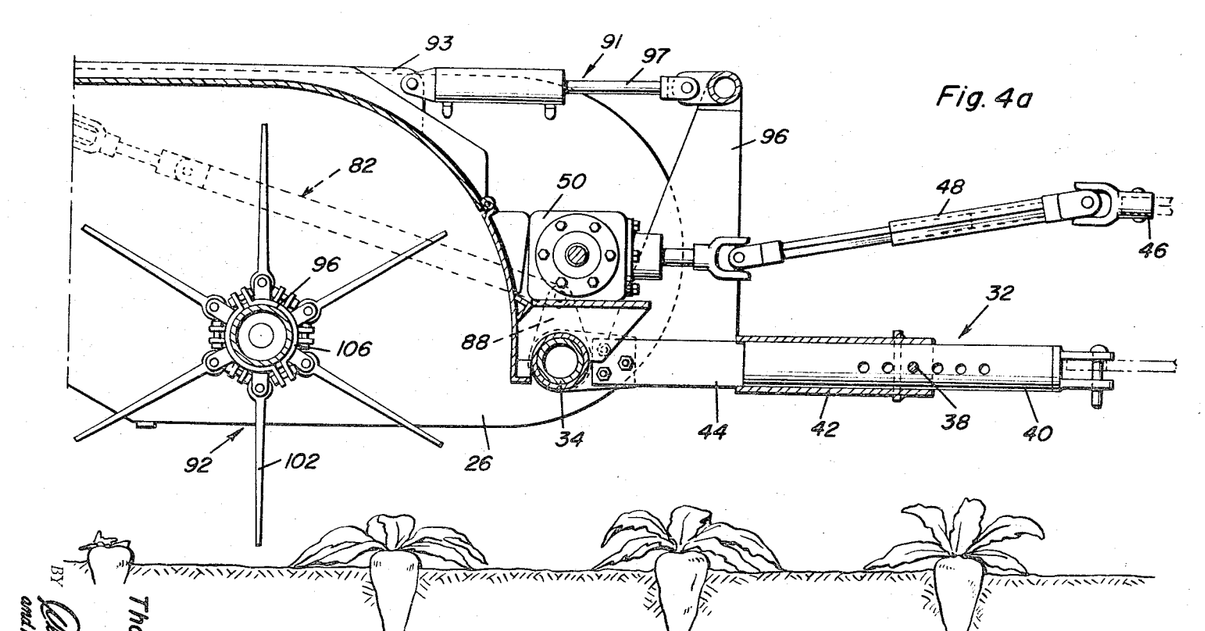
Figure 10:
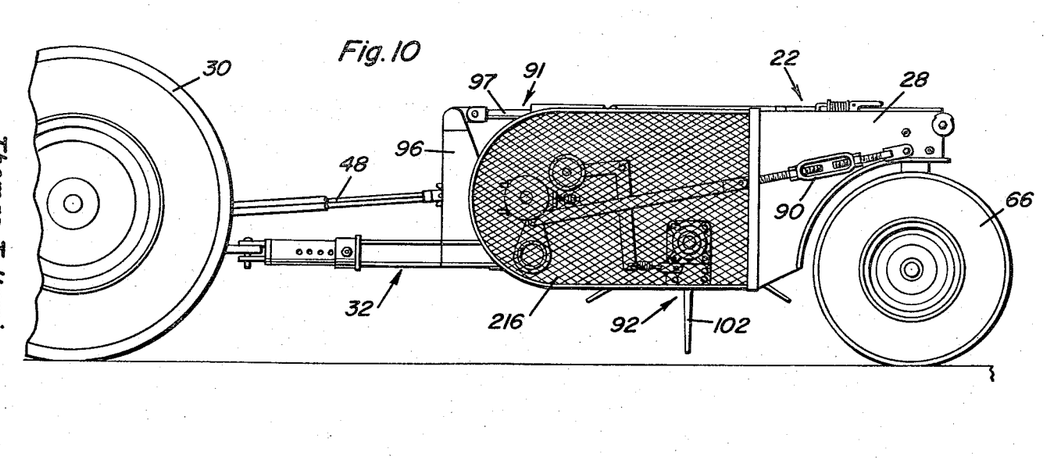
FIGURE 10 is a side elevational view of the apparatus with the second or trailing section removed.

The apparatus 20 is adapted to be drawn by a conventional farm tractor, indicated generally by reference numeral 30 in FIGURE 10, and as such includes a forwardly projecting telescopic drawbar unit 32 fixed to the forward end of the front section 22 through a transversely extending rocker shaft 34 rotatably mounted, at the opposite ends thereof by suitable bearings 36, within the opposed vertical wall portions of the front housing or hood 26. With reference to FIGURE 4a, the telescopic nature of the drawbar unit will be readily apparent, the pin 38 being removable so as to enable a telescopic adjustment of the outer clevis carrying pipe 40 within the inner enlarged pipe 42 which is in turn rigidified relative to the rocker shaft 34 by the bracing structure 44. The driving of the various elements on the apparatus 10 is to preferably be effected directly from the towing vehicle's power take-off 46 through a universal slip shaft 48 and a right angle gear box 50 basically containing a single pinion gear and two ring gears so as to give the oppositely directed output shafts 52 and 54 opposite directional rotation.

The rear portion of the front section hood 26 has a transverse axle bar 56 fixed thereto by for example bolting bar mounted end plates 58 to the opposite vertical walls of the housing 26. The bar 56 in turn mounts a pair of vertically adjustable wheel struts 60, the vertical adjustment of the struts 60 being effected through bolt connected telescopically adjustable upper and lower members 62 and 64 which are provided with noncircular cross-sections whereby and tendency for a rotational misalignment will be resisted. Each of the struts 60 in turn rotatably mounts, through a suitable stub shaft, a wheel 66, the adjoining portion of the housing side wall being recessed, as at 68, for the accommodation of the wheel. The upper end of each of the wheel struts 60 is fixed to the bar 56 through a pair of bolted mating clamp sections 70 which enable an adjustment of the struts 60 and wheels 66 transversely of the apparatus 20, this in turn allowing for an accommodation of variations in row spacings.

Figure 7:
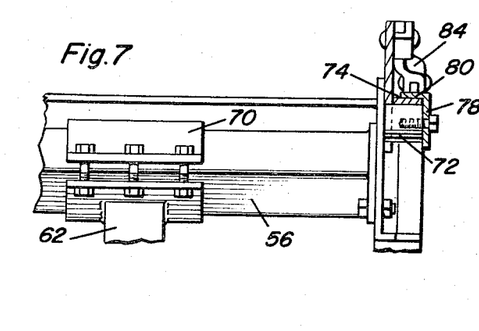
FIGURE 7 is an enlarged detail taken substantially on a plane passing along line 7—7 in FIGURE 3.
Figure 8:
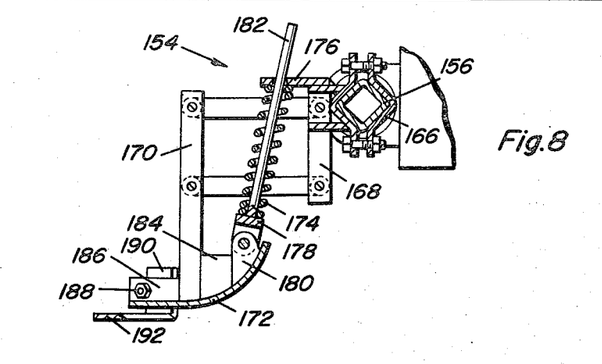
FIGURE 8 is an enlarged cross-sectional view taken through one of the scalper units.

Fixed to the front housing 26, just to the rear of the front wheel axle bar 56, is a pair of outwardly directed shaft like portions 72 which can in fact constitute the opposite ends of a single shaft extending transversely across the housing 26 and being welded to the opposed vertical walls thereof. These shaft portions 72 pivotally receive a pair of downwardly opening hooks or hook portions 74, each being defined in a rigid vertical plate 76 fixed to the opposite sides of the forward portion of the rear section housing or hood 28. Suitable retaining caps 78 are engaged with the outer ends of each of the shaft portions 72 so as to retain the flanged hook portions 74 thereon with the actual retention, noting FIGURE 7, being effected through an inturned lip 80 on each retaining cap 78 which overlies the corresponding hook flange. In this manner, the front and rear sections are pivotally interlocked substantially vertically above the aligned wheel axes.

The rear section is additionally engaged with the forward section 22 by a pair of link units 82, each having a first end 84 thereof pivotally engaged with one of the vertical hook defining plates 76 directly above the hook portion 74, and the other end 86 thereof pivotally engaged with a radially extending arm 88 rigid with the adjoining end of the rocker shaft 34. It will be noted that each of the link units 82 has a length adjusting turnbuckle arrangement 90 incorporated therein so as to allow for an adjustment of the effective length of the links 82.

The simultaneous vertical adjustment of the sections 22 and 24 is effected by the fluid piston and cylinder unit 91 engaged between the top forward portion of the front housing 26, and more particularly a pair of mounting ears 93 thereon, and the upper end of a pair of vertical pedestal defining plates 96 rigidly affixed to the bracing unit 44 of the drawbar 32. In this manner, the extension or retraction of the piston 97 will produce a direct vertical pivoting of the front section 22 relative to the rocker shaft 34, and through the linkages 82, a corresponding pivotal movement of the rear section about the shaft portions 72. The piston and cylinder unit 91 is to be conventionally supplied through appropriate fluid lines from the hydraulic system of the drawing tractor from which it will also be controlled.

The actual beet topping or defoliage is effected through front and rear flails or flail units 92 and 94, each fixedly mounted to a drum or rotor shaft, the shaft in the front section 22 being indicated by reference numeral 96 and the shaft in the rear section 24 being indicated by reference numeral 98. Both of the shafts 96 and 98 have reduced end portions which are rotatably mounted within the opposed vertical wall portions of the housings 26 and 28 through appropriate bearing units 100 and which project transversely therebeyond on at least one side for engagement with the driving assembly as shall be described presently.

Figure 5:
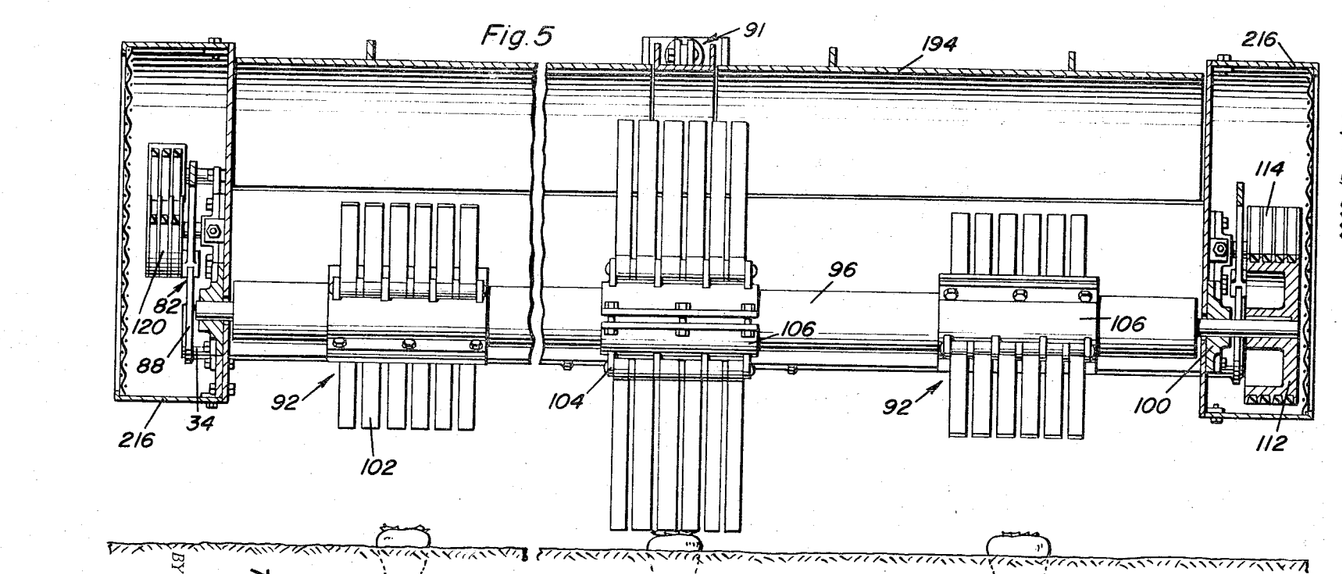
FIGURE 5 is an enlarged transverse cross-sectional view taken substantially on a plane passing along line 5—5 in FIGURE 1 and illustrating the front drum mounted flails.

The front flails or flail units 92 include several sets of flail blades 102 pinned to outwardly projecting mounting lugs 104 positioned in circumferentially spaced relation to each other about a split clamp 106 which is in turn fixedly bolted to the drum 96. As will be appreciated from FIGURE 5, the flail units 92 are rotationally offset from each other so as to achieve a static balance in the shaft 96, this being necessary because of the speed at which the shaft 96 would normally turn. The flail blades 102 on the front flail units 92 can be of either rubber or steel, or a combination thereof, it being contemplated that a major portion of the shredding operating be done by these front flails 92. Further, while the flail units 92 have been illustrated, in FIGURE 5 as being orientated solely above the beet rows, additional units 92 can be provided along the full length of the shaft or drum 96 so as to also effect a positive shredding of any weeds, etc. which might appear between the rows.

The rear flails or flail units 94, having the flail blades 102 mounted thereon in the same manner as the forward flail blades, are also similarly clamped to the corresponding shaft 98 by bolted split clamps 106. However the rear flails 94, in each instance, include fewer sets of flail blades 102 than the corresponding front flails 92 in that the bulk of the shredding operation is to be done by the front flails. The flail blades 102 on the rear flails 94 are to preferably be made of rubber and rotated in the opposite direction from the front flails 92 so as to remove any remaining green material or foliage and generally produce a sweeping or cleaning action over the beets, thus depositing the shredded foliage and debris between the individual beet rows and presenting clean rows for the subsequent crowning and digging of beets. The rear flails 94 are to, of course, be located solely over the beet rows. Incidently, it will be appreciated that the rotational driving of the flails 92 and 94 in opposite directions will produce an effective removal and shredding of the foliage through the alternate engagement of each beet from one side then the other.

Turning now to the driving means for the flails, it will be noted that the universally connected output shaft 52 is journaled at its outer end by a bearing unit 108 and has a multi-grooved V-belt sheave 110 on the extreme outer end thereof. A similar multi-groove V-belt sheave 112 is fixed to the projecting end of the drum or shaft 96 for the forward flails 92 immediately therebehind with the power being transmitted from the front sheave 110 to the sheave 112 through a plurality of drive belts 114 entrained thereabout. Incidently, in order to maintain the proper tension in the belts 114, the bearing unit 108 is adjustably mounted by, for example, extending the mounting bolts thereon through elongated slots within the corresponding housing side wall with a similar elongated slot being provided for the output shaft 52 itself and with a positioning screw means 116 being mounted on the housing side wall and engaged with the bearing unit 108 for effecting a positioning thereof.

The output shaft 54 is similarly universally engaged with the gear box 50 and similarly has its outer end engaged within an adjustably mounted bearing unit 118 for maintaining the desired tension on a plurality of belts 120 entrained about a multiple-groove V-belt sheave 122 fixed to the outer projecting end thereof. The endless belts 120 are also engaged about a second multiple groove sheave 124 mounted on a bearing mounted rotatable countershaft 126 on the forward portion of the rear section 24 substantially at the point of pivotal engagement between the sections 22 and 24. A roller chain sprocket 128 is also mounted on the countershaft 126, this sprocket 128 transmitting the driving power through an endless roller chain 130 to the sprocket 132 mounted on the projecting end of the rear drum or shaft 98 so as to effect a driving thereof in a direction opposite from the driving direction of the front shaft 96. It is contemplated that the apparatus include an oil tank 134 whereby a continuing lubrication of the chain 130 will be possible utilizing a dripper unit 136. Further, so as to automatically retain the proper tension within the belts 120 and chain 130, spring biased compensating or idler wheels 138 and 140 are provided. The wheel 138 is rotatably mounted on the outer end of one arm 142 of an L-shaped member 144 which is pivotally mounted at the angle between the arms to the adjoining vertical housing wall and which has the outer end of the second arm 146 thereof spring biased, as by coiled tension spring 148, in a manner so as to constantly bias the wheel 138 against the belts 120. The wheel 140, in the nature of a sprocket, is rotatably mounted on one end of a bar 150 which is pivotally mounted to the adjoining housing wall at a central point and which has the other end thereof biased by spring 152 in a manner so as to resiliently engage the sprocket 140 against the chain 130.

As will be appreciated, the countershaft 126 functions so as to both raise the drive chain above the section supporting wheels 66 and so as to provide for a common pivot point for the belts 120 and chain 130 at approximately the point of pivotal engagement between the sections 22 and 24, this in turn resulting in only a minor variation in the belt and chain tensions which can easily be compensated for by the spring biased wheels 138 and 140.

Figure 1:
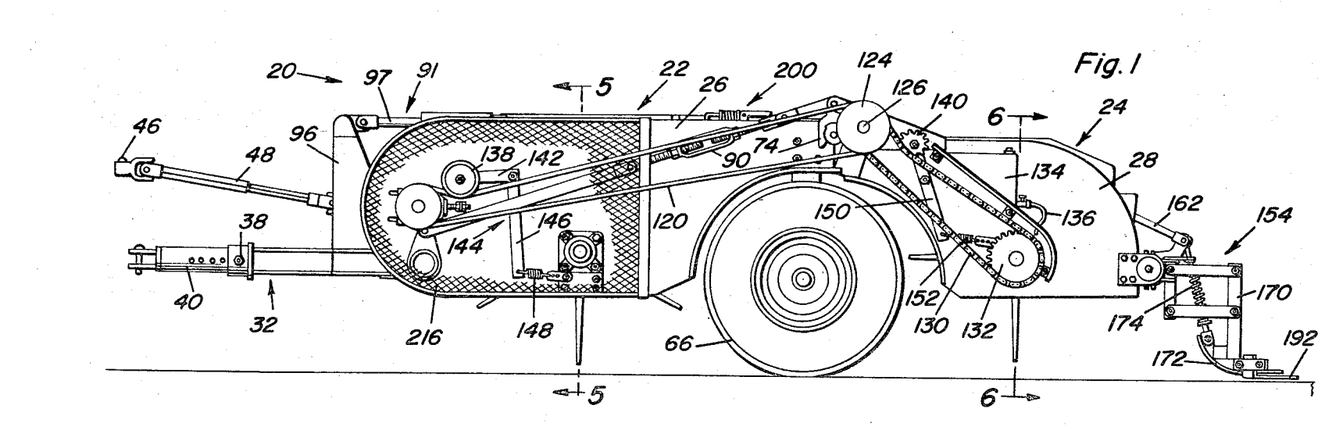
FIGURE 1 is a side elevational view of the apparatus with a portion of the protective screen broken away for purposes of illustration.
Figure 2:
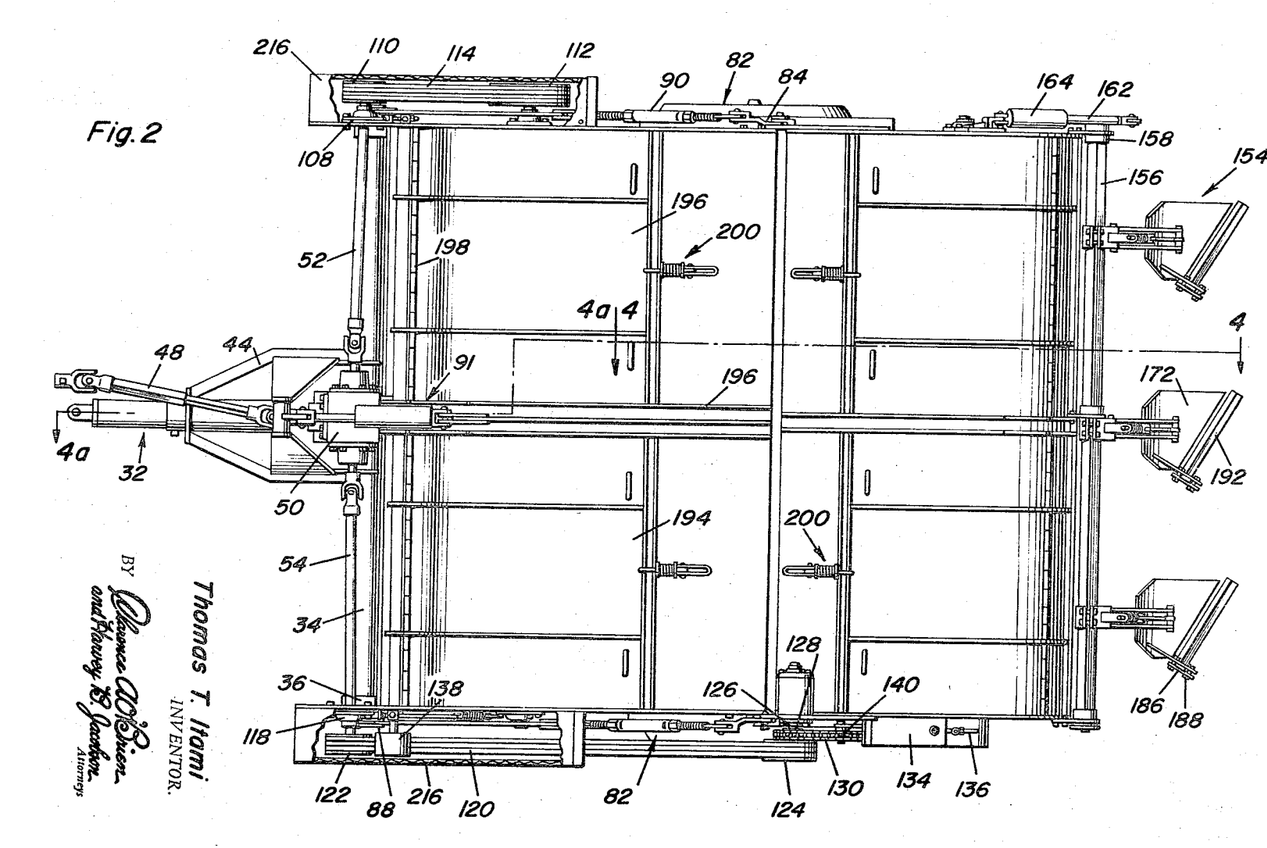
FIGURE 2 is a top plan view of the apparatus.

After the flail units 92 and 94 have passed over and completely shredded the foliage, the crowns of the beets are to be removed through the operation of scalper units 154, one aligned with each row. Initially, an elongated mounting shaft 156 extends transversely across the lower portion of the rear section 24 and is rotatably mounted thereon through suitable bearing units 158 engaged with the vertical wall portions of the rear housing 28. One end of this shaft 156 projects beyond the corresponding vertical wall and has, rigid therewith, a laterally projecting control arm 160 to which an extensible and retractable piston 162 is pivotally engaged, this piston in turn being received within and controlled by a hydraulic cylinder 164 pivotally engaged with the corresponding housing side wall. This piston and cylinder unit is to be supplied from the tractor hydraulic reservoir through suitable fluid lines with the control therefor preferably being mounted on the tractor. Each of the scalper units 154 is mounted for longitudinal adjustment along the shaft 156 by a suitable bolted split clamp 166 which conforms to the non-circular cross-section of the shaft 156 so as to avoid any problem of rotation therebetween. Rigid with the split clamp 156 on each of the scalper units 154 is a vertical member 168 of a parallelogram linkage. The member 170, paralleling the member 168, extends beyond the linkage and has an enlarged arcuate shoe 172 welded thereto. The arcuate face of the shoe 172 is directed forwardly along the path of travel of the apparatus 20 for engagement with the crowns of the beets with the individual shoe riding or sliding upwardly over the beet crowns against the biasing force of the corresponding coiled compression spring 174 engaged between a rearwardly projecting abutment plate 176 fixed to the split clamp 166 and an abutment 178 hingedly engaged to the forward portion of the shoe 172 through upwardly projecting ears 180. The abutment 178 also has an elongated centering rod 182 welded thereto and projecting therefrom through the spring 174 and an aligned aperture within the superimposed abutment plate 176. Incidently, the linkage members, including members 168 and 170 can, if so desired, consist of spaced bars as indicated in FIGURE 2 with the spring 174 and rod 182 extending therebetween. Further, additional rigidity can be introduced into the engagement between the shoe 172 and the member 170 through the use of welded bracing plates 184.

Figures 6, 9:
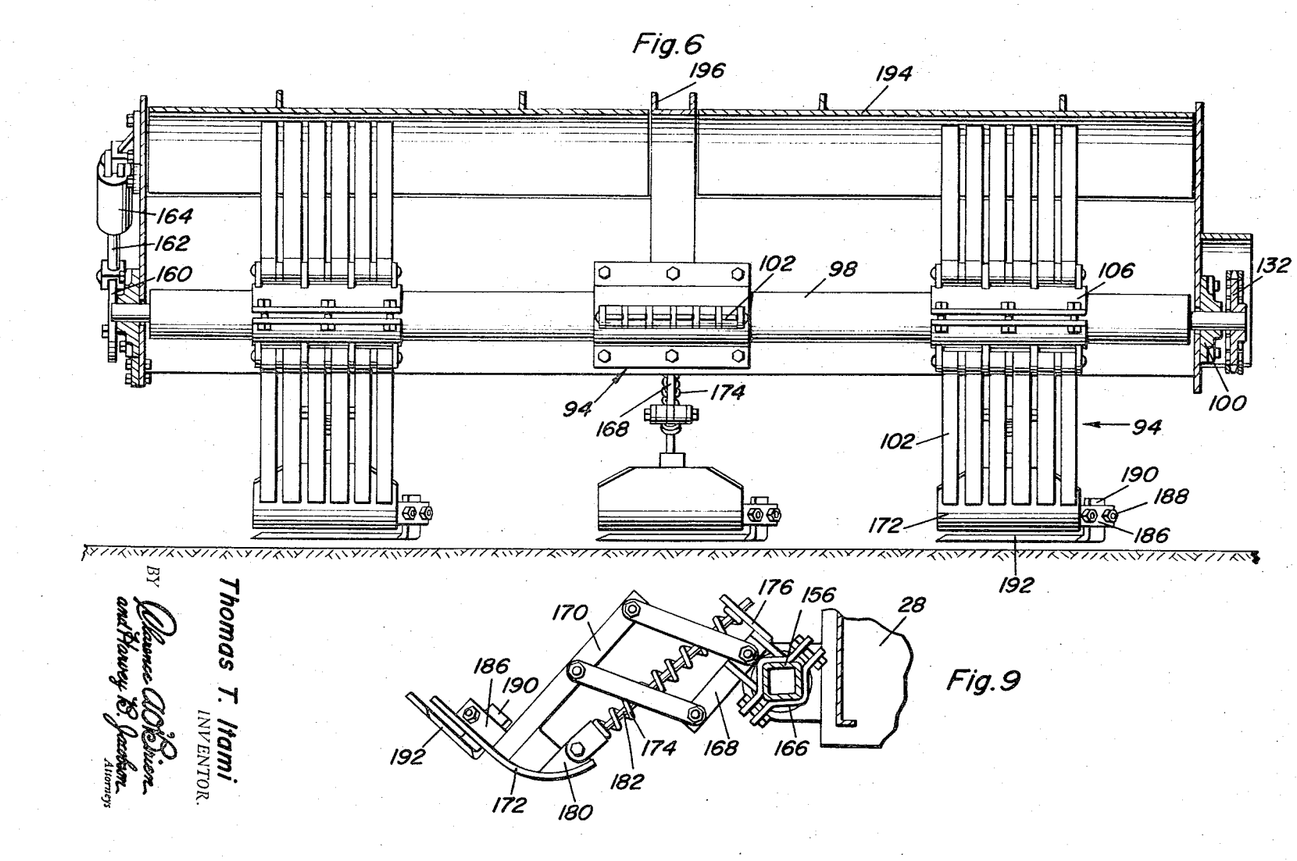
FIGURE 6 is an enlarged transverse cross-sectional view taken substantially on a plane passing along line 6—6 in FIGURE 1 and illustrating the rear drum mounted flails.
FIGURE 9 is a view similar to FIGURE 8 illustrating the scalper unit in an adjusted position.

Each shoe 172 includes a pair of spaced parallel horizontally projecting mounting panels or ears 186 which can be selectively biased toward each other by a pair of clamping bolts 188. These panels or ears 186 slidably receive, vertically therebetween, the mounting stem 190 of a horizontally orientated crown removing blade or knife 192. In use, the amount of the beet crown to be severed is determined and the blade 192 is spaced accordingly from the bottom of the corresponding shoe 172 by a vertical sliding of the right angularly related mounting stem portion 190 between the clamping ears or panels 186. Upon being properly positioned, the clamping bolts 188 are tightened so as to effect a flexing of the panels 196 toward each other into clamping engagement with the sandwiched stem 190, thereby fixing the vertical position of the blade 192 relative to the shoe. As such, as each shoe rides over a beet, pivoting upward against the biasing force of the spring 174 which tends to insure proper engagement of the shoe with the beet crown, the blade 192 contacts and severs the crown at the preselected point below the top thereof. In this manner, regardless of the variations in the heights of the projecting portions of the beets, the same amount of crown will be severed. Incidently, it will be appreciated that the cutting edge of each of the blades 192 is oriented at an angle to the path of movement of the apparatus 20 thus providing for a smooth slicing action so as to properly sever the crown without mutilating or dislodging the beet. The raising of the scalper units 154 for road travel or when turning, as indicated in FIGURE 9, will of course be effected through the aforementioned piston and cylinder controlled mounting shaft 156.

Figure 3:
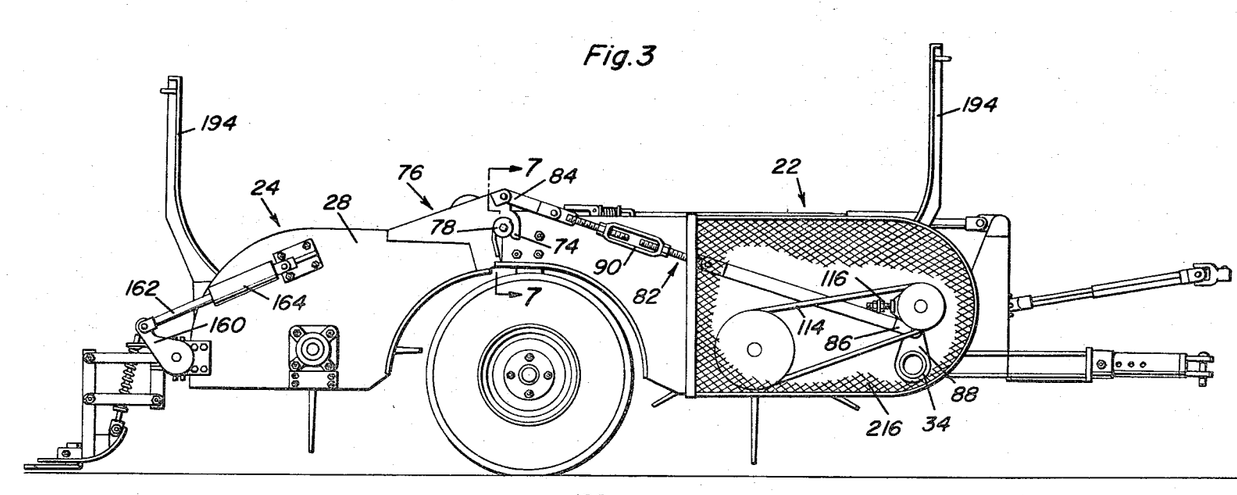
FIGURE 3 is a side elevational view of the opposite side of the apparatus from that shown in FIGURE 1 with the access lids being opened.

Another significant feature of the instant invention is the fact that both housings 26 and 28 have substantially the entire portions of the tops or top walls thereof constructed in the form of hingedly mouned lids or doors 194 which can be quickly unlatched and opened, as indicated in FIGURE 3, so as to enable free access to the flail units for any adjustment, cleaning, etc. which might be necessary. Each of the doors 194, it being contemplated that two such doors be incorporated into each of the housings, one on each side of a central support beam 196, includes a piano-type hinge 198 along the full length thereof with the opposite edge of the corresponding door 194 being selectively locked by an over-center spring latch unit 200. This lock unit 200, referring to FIGURE 4, consists basically of a hooked rod 202 having the shank portion thereof slidably received through a plate 204 fixed to the housing outward of the door opening with the hook portion thereof selectively engageable over an edge flange 206 on the door 194. The opposite or unhooked end of the rod shank is pivotally engaged with an enlarged cam 208, controlled through handle 210. A coiled compression spring 212 is engaged about the shank and bears against both the shank mounting plate 204 and an abutment plate 214 bearing against the cam 208. The cam 208 is so orientated as to, upon a raising of the handle 210, effect a slackening of the biasing force of the spring 212 sufficient so as to enable a rotation of the rod shank so as to withdraw the hook portion away from the door flange 208. At this point, the spring itself will effect a rearward movement of the hook portion away from the door 194 so as to enable a free opening of the door. When a subsequent relocking of the door 194 is to be effected, the door is closed and the hooked rod 202 physically forced forward and rotated so as to engage the hook portion behind the door flange 206 after which the handle 210 is depressed so as to utilize the cam 208 in compressing the spring and effecting a positive clamping of the door flange 206 between the hooked portion of the rod 202 and the mounting plate 204.

As will be appreciated from the drawings, it is also contemplated that protective screen cages 216 be provided on the front section 22 over the drive assembly elements on either side of the housing 26, these protective screen cages 216 being preferably bolted to the adjoining housing portions for easy removal so as to enable free access to the drive assembly elements.

With particular reference to FIGURE 10, it should also again be pointed out that through the unique manner of engaging the rear section 24 with the front section 22, this rear section 24 can be simply and quickly disengaged so as to enable use of the front section 22 alone with, for example, potatoes or other crops wherein a single flail or rotor unit is desirable. This removal of the rear or trailing section 24 involves only a disengagement of the link units 82, an unhooking of the hook portions 74, and a removal of the drive belts 120, all of these operations being easily and quickly effected in a manner which will enable the mounting and removal of the rear section 24 at will in accordance with the demands of any particular situation.

From the foregoing, it should be appreciated that a highly novel apparatus has been defined, this apparatus, preferably usable as a double unit including a front and rear flailing sections, also being constructed so as to enable a ready demounting of the rear section for use as a single unit. In use as a double unit, the centrally located supporting sheels provide for an extremely easy handling of the dual unit with the handling of the dual unit being further simplified through the manner in which a simultaneous vertical adjustment of both sections is achieved from a single piston and cylinder unit. Further utility and adaptability is incorporated into the apparatus through the particular manner in which the flail units and wheel assemblies are mounted for adjustment transversely of the path of travel of the apparatus whereby an accommodation to different row spacings can be quickly made. Likewise, particular significance is considered to reside in the fact that the apparatus of the instant invention provides for a complete preparation of the beets for digging by not only removing all of the green matter or foliage, but also crowning the beets through a device which insures the removal of the same amount of beet crown regardless of depth differences in the various beets.

Basically, in preparing the apparatus for operation, the flail units and wheel assemblies are adjusted transversely of the device on their respective shafts, an initial positioning of the rear section reltaive to the front section is effected through an adjustment of the length of the link units, with any further adjustments being effected through the hydraulic ram engaged between the front section and the drawbar mount, and the beet crown removing blade is adjusted relative to the height controlling shoe. As noted supra, the flailing units on the front section can extend across the full width of the apparatus so as to enable a flailing of the weeds between the beet rows. However, the rear flailing units, generally provided with rubber blades, are to be orientated solely above the beet rows so as to effect a completion of any foliage removing and shredding in conjunction with a sweeping of the shredded foliage and debris away from the beet tops and into the spaces in between the rows so as to allow free access to the crowns by the scalping units and any suitable subsequent beet digging apparatus.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Crop cleaning apparatus comprising front and rear juxtaposed frame sections, crop working means on each section, hook means releasably interconnecting said sections about a pivotal axis, support wheel means on the front section below the pivotal axis, link means interconnected with the hook means for holding the sections assembled in adjusted angular relation about said pivotal axis, with said rear section being cantilevered rearwardly from the pivotal axis spaced above the ground.

2. The apparatus of claim 1 wherein each of said crop working means comprises an elongated drum extending between and rotatably supported by the associated frame section, and at least one flail unit adjustably mounted on said drum.

3. The apparatus of claim 2 wherein the means for driving the rear section drum includes a power take-off driven gear box, an output shaft drivingly associated with said gear box and projecting laterally therefrom, first wheel means mounted on the outer end of said output shaft, a countershaft mounted on one of said sections adjacent the pivotal axis, second wheel means mounted on said countershaft, endless belt means encircling said first and second wheel means and providing for a transfer of power therebetween, a third wheel means mounted on said countershaft, a fourth wheel means mounted on said rear section drum, and endless belt means connecting said third and fourth wheel means, thereby providing for a flexing point in the drive train adjacent the pivotal axis.

4. The apparatus of claim 2 including at least one scalping unit mounting on the rear section, said scalping unit comprising a gauging foot, a cutting blade, means mounting said blade on said foot for vertical adjustment relative thereto, and means for vertically adjusting said foot relative to said second section.

5. The apparatus of claim 4 wherein said frame sections define housings enclosing the drums and flail units thereon, said housings including pivotally mounted top walls selectively openable so as to expose substantially the entire enclosed drums and flail units.

6. The apparatus of claim 4 wherein said gauging foot includes an upwardly curving forward portion adapted to ride over the crop, means mounting said foot for free vertical movement within a limited range, and means resiliently biasing said foot downwardly against upward movement as the foot rides over the crop.

7. The apparatus of claim 1 wherein the hook means comprises a pair of shaft portions projecting laterally from one of the sections, and hooks projecting outward from the other section and selectively engageable over said shaft portions, said hooks being rotatable about said shaft portions.

8. A defoliating apparatus comprising a wheeled frame, hitch means pivotally connected to the frame for towing the same, a frame section, hook means pivotally connecting the frame section to the wheeled frame in trailing relation thereto, adjustable means interconnecting the hitch means with the hook means for holding the frame section in an angularly adjusted position cantilevered rearwardly from the wheeled frame, bladed rotors mounted by the frame and the frame section in spaced relation above the ground, and drive means rotatably mounted by the frame section adjacent the hooks means for transfer of power to the motor mounted by the frame section.

9. The combination of claim 8 including power distributing means mounted by the hitch means having a pair of output shafts extending laterally of said frame in opposite directions, and means drivingly connecting said output shafts respectively to the drive means and the rotor mounted by the wheeled frame on opposite lateral sides of the frame.

References Cited

UNITED STATES PATENTS

| | | | |
|---|---|---|---|
| 842,021 | 1/1907 | Sandberg | 171—29 |
| 3,031,833 | 5/1962 | Nelson | 56—328 |

ANTONIO F. GUIDA, *Primary Examiner.*

U.S. Cl. X.R.

56—238